(12) United States Patent
Yang et al.

(10) Patent No.: US 10,748,572 B1
(45) Date of Patent: Aug. 18, 2020

(54) WAVEGUIDE HAVING REFLECTOR FOR HEAT-ASSISTED MAGNETIC RECORDING HEAD

(71) Applicant: Seagate Technology LLC, Cupertino, CA (US)

(72) Inventors: Ruoxi Yang, Plymouth, MN (US); Yongjun Zhao, Eden Prairie, MN (US); Weibin Chen, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/243,355

(22) Filed: Jan. 9, 2019

Related U.S. Application Data

(60) Provisional application No. 62/615,082, filed on Jan. 9, 2018.

(51) Int. Cl.
| | |
|---|---|
| *G11B 11/105* | (2006.01) |
| *G11B 11/24* | (2006.01) |
| *G11B 5/012* | (2006.01) |
| *G11B 5/00* | (2006.01) |
| *G11B 5/31* | (2006.01) |
| *G11B 5/60* | (2006.01) |

(52) U.S. Cl.
CPC .............. *G11B 11/24* (2013.01); *G11B 5/012* (2013.01); *G11B 5/314* (2013.01); *G11B 5/3143* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 8,873,352 B1* | 10/2014 | Jandric | ................ | G11B 5/3133 369/112.27 |
| 9,558,769 B1* | 1/2017 | Kim | ....................... | G11B 5/314 369/13.33 |
| 9,911,441 B1* | 3/2018 | Jandric | .................. | G11B 5/314 369/13.33 |
| 9,934,801 B1* | 4/2018 | Wessel | ................... | G11B 5/607 369/13.33 |
| 10,068,596 B2* | 9/2018 | Staffaroni | ............ | G11B 5/4866 369/13.33 |
| 10,127,937 B1* | 11/2018 | Wessel | ................... | G11B 5/314 369/13.33 |
| 10,249,326 B1* | 4/2019 | Peng | ....................... | G11B 5/012 369/13.33 |
| 10,395,680 B1* | 8/2019 | Wessel | ..................... | G11B 5/40 369/13.33 |
| 2007/0081426 A1* | 4/2007 | Lee | ....................... | G11B 5/1278 369/13.33 |

(Continued)

*Primary Examiner* — Tan X Dinh
(74) *Attorney, Agent, or Firm* — Mueting Raasch Group

(57) ABSTRACT

A recording head comprises a waveguide extending to an air-bearing surface, and the waveguide comprises a core surrounded by cladding layers. A near-field transducer is disposed on a first side of the core, and a reflector, comprising a layer of metallic material, is disposed on a second side of the core facing away from the first side. The reflector extends beyond the core in a cross-track direction and extends in a direction normal to the air-bearing surface. The reflector has a thickness in a downtrack direction of less than 200 nm.

17 Claims, 14 Drawing Sheets

(56) References Cited

U.S. PATENT DOCUMENTS

| | | | | |
|---|---|---|---|---|
| 2009/0052077 A1* | 2/2009 | Tanaka | ................... | G11B 5/02 |
| | | | | 369/13.33 |
| 2015/0325261 A1* | 11/2015 | Yang | ................... | G11B 5/3133 |
| | | | | 369/13.33 |
| 2016/0118069 A1* | 4/2016 | Yang | ................... | G11B 5/1871 |
| | | | | 369/13.33 |
| 2016/0293189 A1* | 10/2016 | Yang | ................... | G02B 6/126 |
| | | | | 369/13.33 |

\* cited by examiner

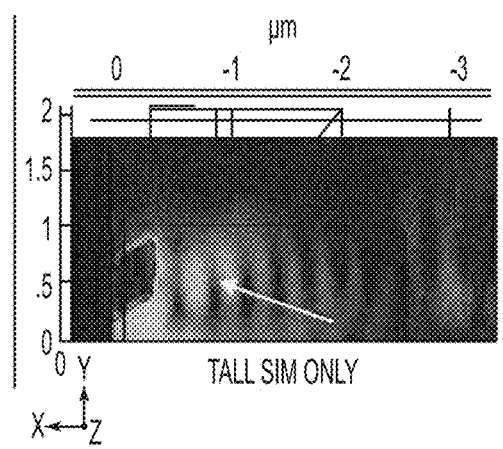 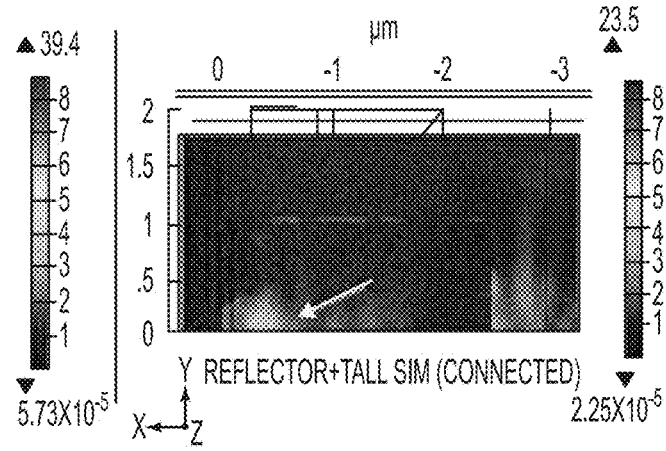
FIG. 11A     FIG. 11B
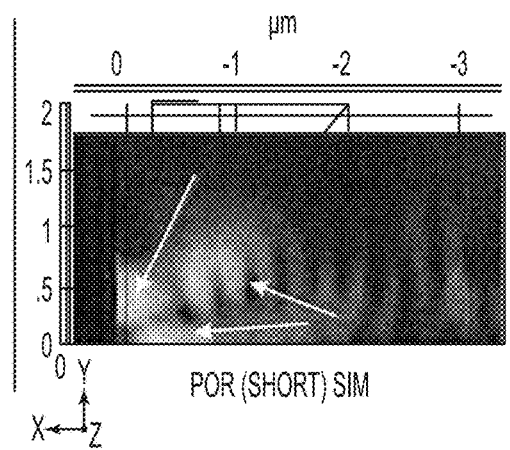 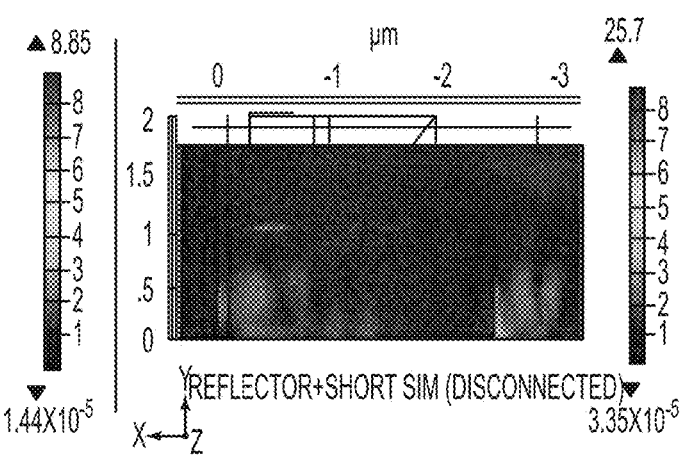
FIG. 12A     FIG. 12B

US 10,748,572 B1

WAVEGUIDE HAVING REFLECTOR FOR HEAT-ASSISTED MAGNETIC RECORDING HEAD

RELATED PATENT DOCUMENTS

This application claims the benefit of Provisional Patent Application No. 62/615,082 filed on Jan. 9, 2018, which is incorporated herein by reference in its entirety.

SUMMARY

Embodiments of the disclosure are directed to a recording head. The recording head comprises a channel waveguide extending to an air-bearing surface, where the waveguide comprises a core surrounded by cladding layers. The recording head further includes a near-field transducer on a first side of the core, and a reflector comprising a layer of metallic material on a second side of the core facing away from the first side. The reflector extends beyond the core in a cross-track direction and extends in a direction normal to the air-bearing surface. The reflector has a thickness in a downtrack direction of less than 200 nm.

Further embodiments are directed to a recording head. The recording head comprises a waveguide extending to an air-bearing surface, where the waveguide comprises a core surrounded by cladding layers. A near-field transducer is disposed on a first side of the core, and a reflector comprising a layer of metallic material is disposed on a second side of the core facing away from the first side. The reflector extends beyond the core in a cross-track direction and extends in a direction normal to the air-bearing surface. The recording head further includes a side coupling structure that extends in the downtrack direction from proximate the near-field transducer and couples to the reflector.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIG. 11A is a thermal diagram of scattered light for a recording head with a tall mini solid-immersion mirror (miniSIM) (or other side-coupling structures and optical side-shield);

FIG. 11B is a thermal diagram of scattered light for a recording head with a tall miniSIM (or other side-coupling structures and optical side-shield) with a reflector;

FIG. 12A is a thermal diagram of scattered light for a recording head with a short miniSIM (or other side-coupling structures and optical side-shield);

FIG. 12B is a thermal diagram of scattered light for a recording head with a short miniSIM (or other side-coupling structures and optical side-shield) with a reflector;

DETAILED DESCRIPTION

Figure 1:
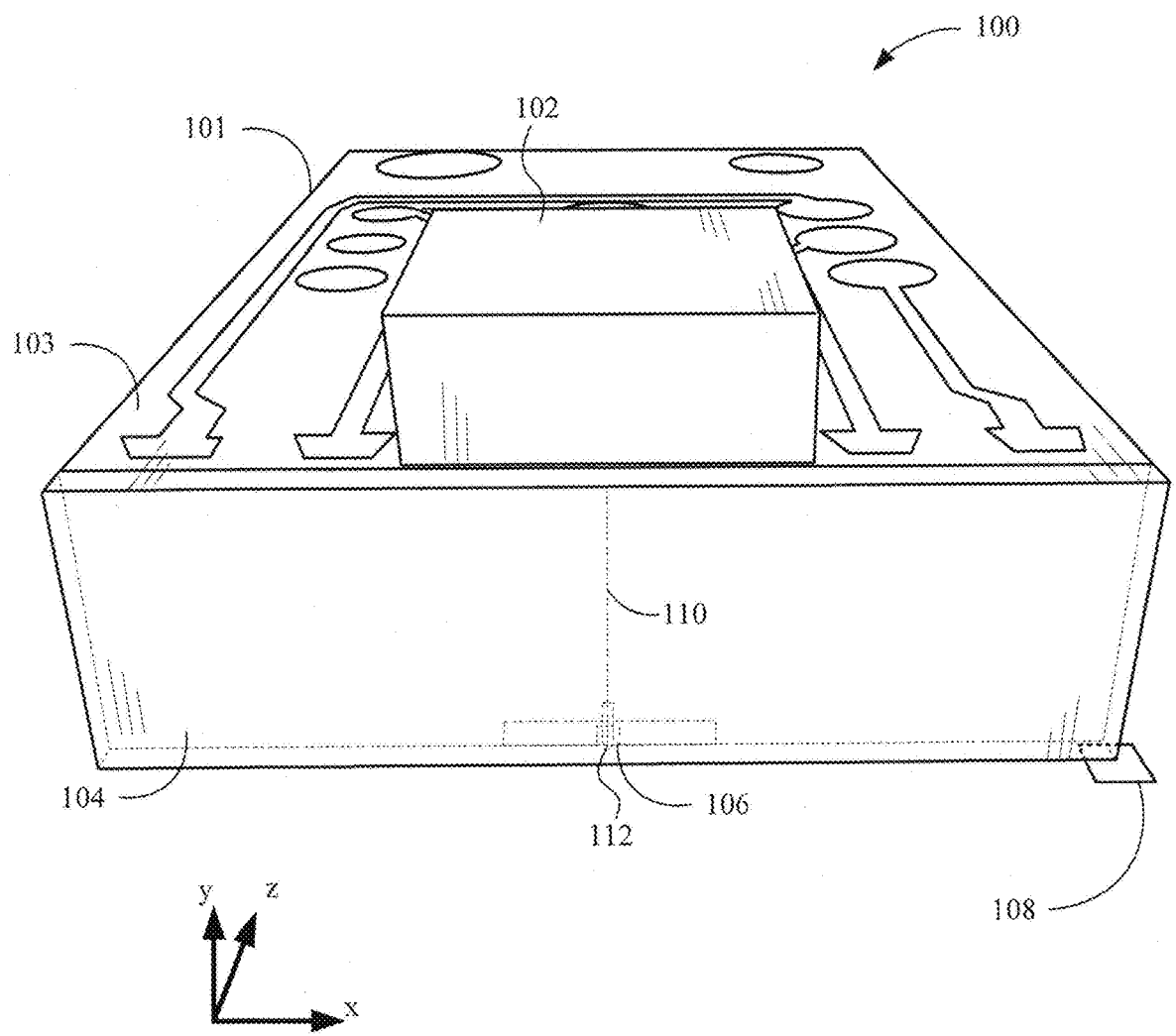
FIG. 1 is a perspective view of a HAMR slider assembly according to embodiments discussed herein.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature (TO and having dimensions less than 100 nm (e.g., ~50 nm).

Typical HAMR waveguides, such as channel waveguides, have no propagation loss, but they can experience mode leakage due to the low index contrast at visible wavelengths of the waveguide materials, as well as due to a relatively small mode index as compared with the cladding material. Channel waveguide to near-field transducer coupling scatters light toward the bottom waveguide cladding (i.e., the cladding on the side of a waveguide core opposite the NFT) in the form of out-of-plane scattering. The scattered light can reach, and be absorbed by, the leading shield thereby increasing the head temperature. The scattered light can also be rescattered and contribute to background light in the recording head, which is also undesirable. Embodiments herein are directed to a reflector disposed on the bottom of the waveguide (i.e., on a side of the waveguide core opposing the NFT) to increase the coupling efficiency of the waveguide and NFT.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media-facing surface 108 faces, and is held proximate to, the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
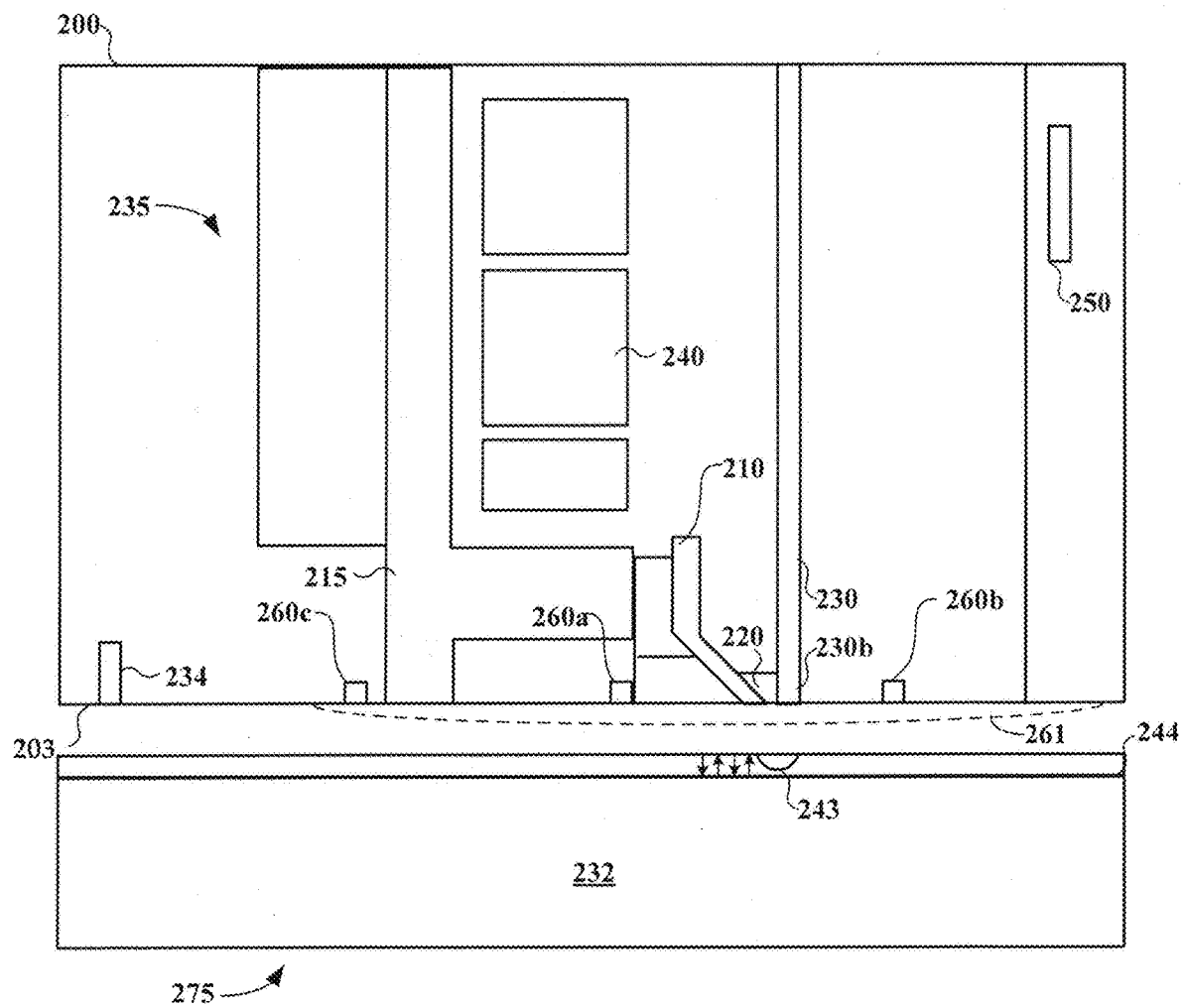
FIG. 2 is a cross-sectional view of a slider assembly according to embodiments discussed herein.

In FIG. 2, a cross-section diagram shows a slider 200 according to various embodiments. The head transducer 200 is shown positioned over a writeable medium 275 (e.g., magnetic disk) and generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicated by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or differential-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220. Thermal sensor 260b may be referred to as a leading sensor as it will pass over the media prior to the NFT and write pole. A thermal sensor may also be located proximate the reader if used primarily for thermal asperity detection.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, detecting contact with the recording medium, and/or monitoring the power of the laser diode. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

Figure 3:
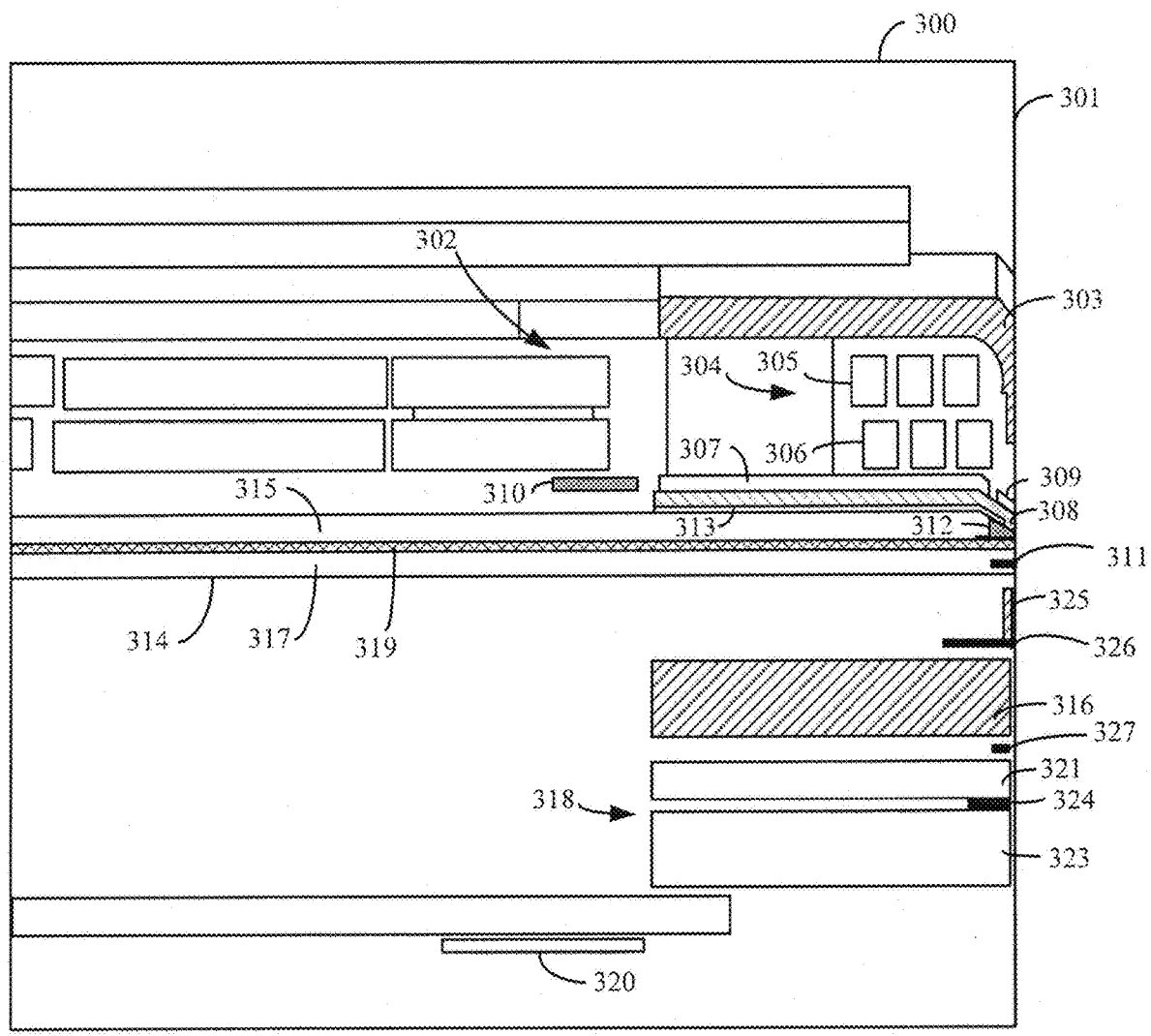
FIG. 3 is a cross-sectional view of portions of a slider body near an air-bearing surface according to embodiments discussed herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A write pole heat sink 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. The writer 302 also includes a leading shield 325, a reflector 326 positioned at or near the ABS, and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 is positioned at or near the ABS 301 in the waveguide cladding 317. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other.

The contact sensors 311, 327 are typically thermal sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider. According to various embodiments described herein, the thermal sensor may be referred to as a contact sensor, a thermal asperity sensor, a laser power monitor, and/or a DETCR. The TCR sensors 311, 327 are configured to sense changes in heat flow for detecting onset of head-medium contact. The TCR sensor 311 is also configured to sense changes in temperature due to light absorption from the waveguide core 319 for monitoring laser power.

Thermal sensor 311 is located on the leading edge, or position, of the slider to pass over the media prior to the NFT and write pole. As a DETCR, the laser power monitoring signal of sensor 311 comes from the temperature change and the resulting resistance change ($\Delta V \sim \Delta R^* I_{bias}$). Therefore, the change in resistance ($\Delta R$) between the laser being "on" and the laser being "off" represents the signal strength. When the laser goes from "off" to "on," three sources can lead to the change in sensor resistance: 1) heat transfer from the NFT region (the closer to the NFT, the higher the $\Delta R$), 2) light absorption (light escaping from the waveguide core), and 3) media back heating (likely an overall small effect on the $\Delta R$). However, a higher change in resistance is accompanied by higher temperatures. Therefore, a stronger signal (higher $\Delta R$) is countered with lower reliability (higher temperature) for the thermal sensor 311. Embodiments described further herein are directed to a reflector disposed in the bottom cladding of the waveguide to mitigate light absorption by shielding stray light, push the power up, enhance the NFT excitation, and consequently reduce the effective current ($i_{eff}$) needed. Lowering the effective current in HAMR increases the reliability of HAMR recording heads.

Figure 4:
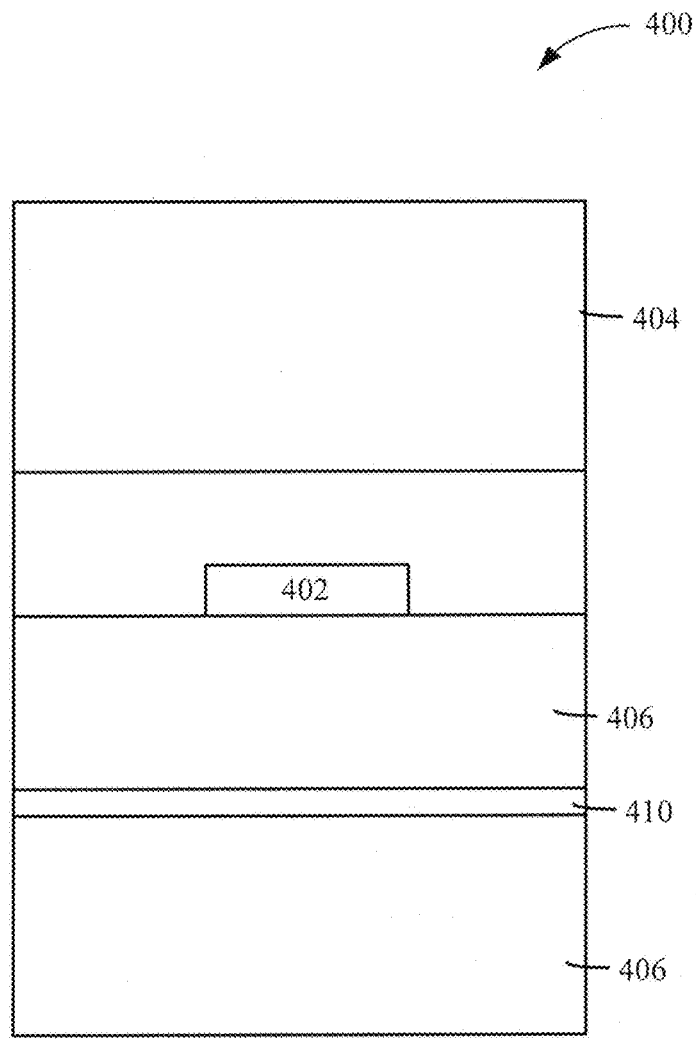
FIG. 4 is a cross-sectional view parallel to an air-bearing surface of a recording head according to embodiments described herein.

FIG. 4 is an ABS-parallel cross-section of a recording head 400. A waveguide is shown having a core 402, top cladding layer 404, and a bottom cladding layer 406. A reflector 410 is disposed on the bottom of the waveguide in the bottom cladding 406 and facing away from the NFT (not shown). The reflector 410 has multiple functions and features. The reflector 410 slightly modifies the guided mode in a channel waveguide and serves as a blocker/jacket for stray/leaked light from the bottom cladding 406. When coupled with a light focusing/reflecting/recycling element near an NFT (e.g., a solid-immersion mirror (SIM) or other side-coupling structures and optical side-shield), the reflector 410 fulfills additional power recycling on top of the optical side-shield, gains additional thermal gradient (TG), and reduces the effective laser current needed for recording ($I_{eff}$). The SIM may be a full sized mirror or a reduced size (i.e., a miniSIM) which has a dimension in the light propagation direction that is less than that of the NFT.

When connected to, or used in combination with, a miniSIM, the reflector 410 potentially provides an additional heat diffusion channel. Optical and thermal modeling shows that, especially when the miniSIM is formed by material with relatively small thermal conductivity and high optical absorption compared to Au, the reflector will be able to lower the NFT temperature by >20K and miniSIM temperature by >50K. Results for this modeling are summarized in Table 1 below.

TABLE 1

| Design | Bottom Reflector | DT TG (K/nm) | CT TG (K/nm) | ATE | Peg ΔT (K) | mSIM ΔT (K) | $I_{eff}$ (mA) |
|---|---|---|---|---|---|---|---|
| Non-Au | OFF | 8.26 | 8.18 | 52.6 | 344 | 186 | 6.83 |
| miniSIM | ON | 8.34 | 8.23 | 52.3 | 323 | 135 | 6.06 |

The reflector 410 is thin (e.g., less than 200 nm thickness in the downtrack direction of the ABS), and induces less topography change in a waveguide as compared with more complex designs, such as a bottom cladding disk. The reflector 410 height (dimension the reflector extends into the recording head) is also small, making the manufacturing process manageable. Each of these features and functions contribute to a waveguide structure with a reflector on the bottom side of the waveguide that increases the coupling efficiency of a HAMR NFT.

Figure 5A:
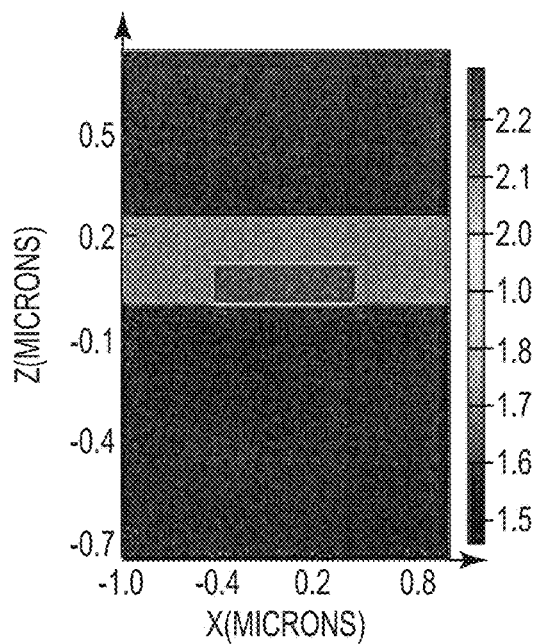
FIG. 5A is a cross-sectional view parallel to an air-bearing surface of a recording head.
Figure 5B:
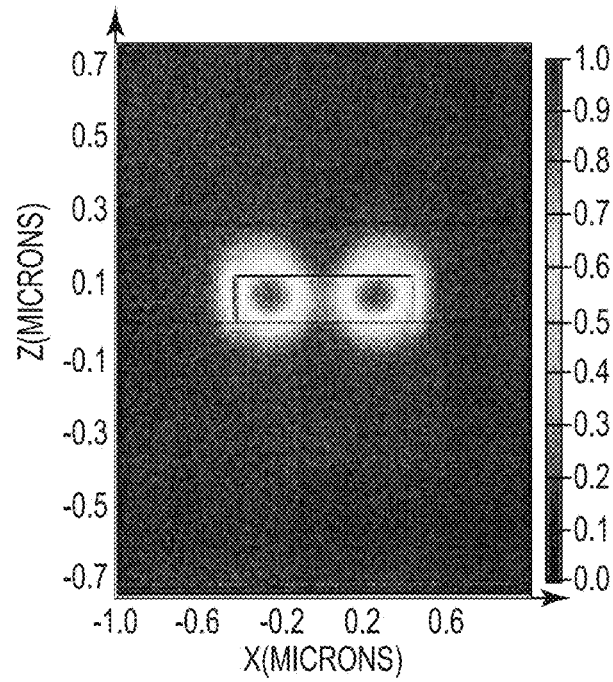
FIG. 5B is a mode plot of the TE10 mode profile of the recording head of FIG. 5A.
Figure 6A:
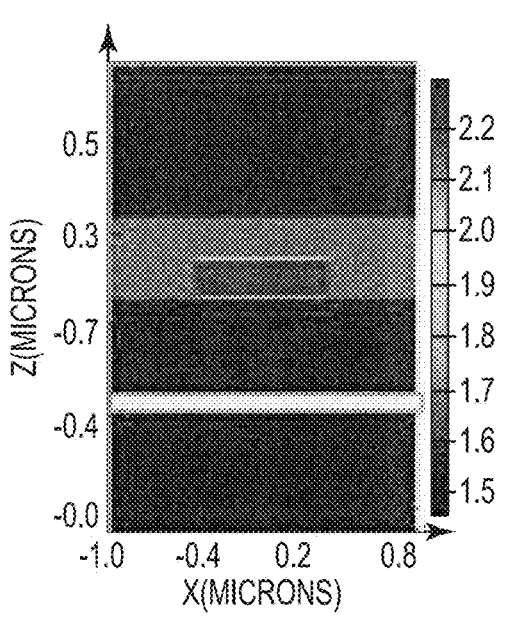
FIG. 6A is a cross-sectional view parallel to an air-bearing surface of a recording head including a reflector according to embodiments described herein.
Figure 6B:
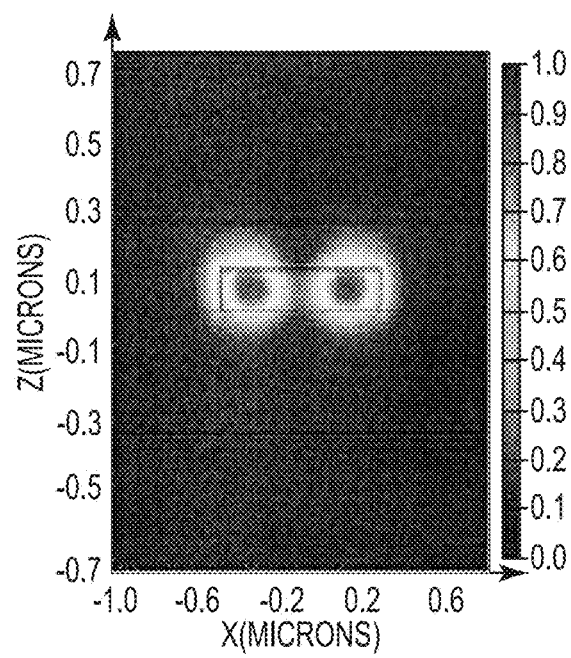
FIG. 6B is a mode plot of the TE10 mode profile of the recording head of FIG. 6A.

FIGS. 5A-B and 6A-B illustrate the effect of including a reflector in the recording head on the TE 10 mode profile of the waveguide. FIG. 5A is an ABS-parallel cross section of a waveguide without a reflector, and FIG. 5B is a mode plot of the TE10 mode profile of the waveguide of FIG. 5A. The waveguide of FIG. 5A has an index of refraction of n=1.650377. In comparison, FIG. 6A is an ABS-parallel cross section of a waveguide enhanced with a reflector, and FIG. 6B is a mode plot of the TE10 mode profile of the waveguide of FIG. 6A. The waveguide of FIG. 6A has an index of refraction of n=1.6493 and a loss, as compared with FIG. 5A, of 8.5449 dB/cm. As shown in FIG. 6B, a reflector in the bottom cladding, when properly spaced with the waveguide core, maintains the TE10 mode profile with very low loss (i.e., <10 dB/cm). In FIGS. 5B and 6B, the |E| field is plotted and shows that the overall TE10 profile is well maintained when a reflector is placed at about 350 nm from the waveguide core. The reflector loss is thus less than 10 dB/cm for equal to or greater than 350 nm reflector spacing. Considering 10 dB/cm loss, a two micrometer long reflector will have a power loss of less than 0.05%.

Figure 7:
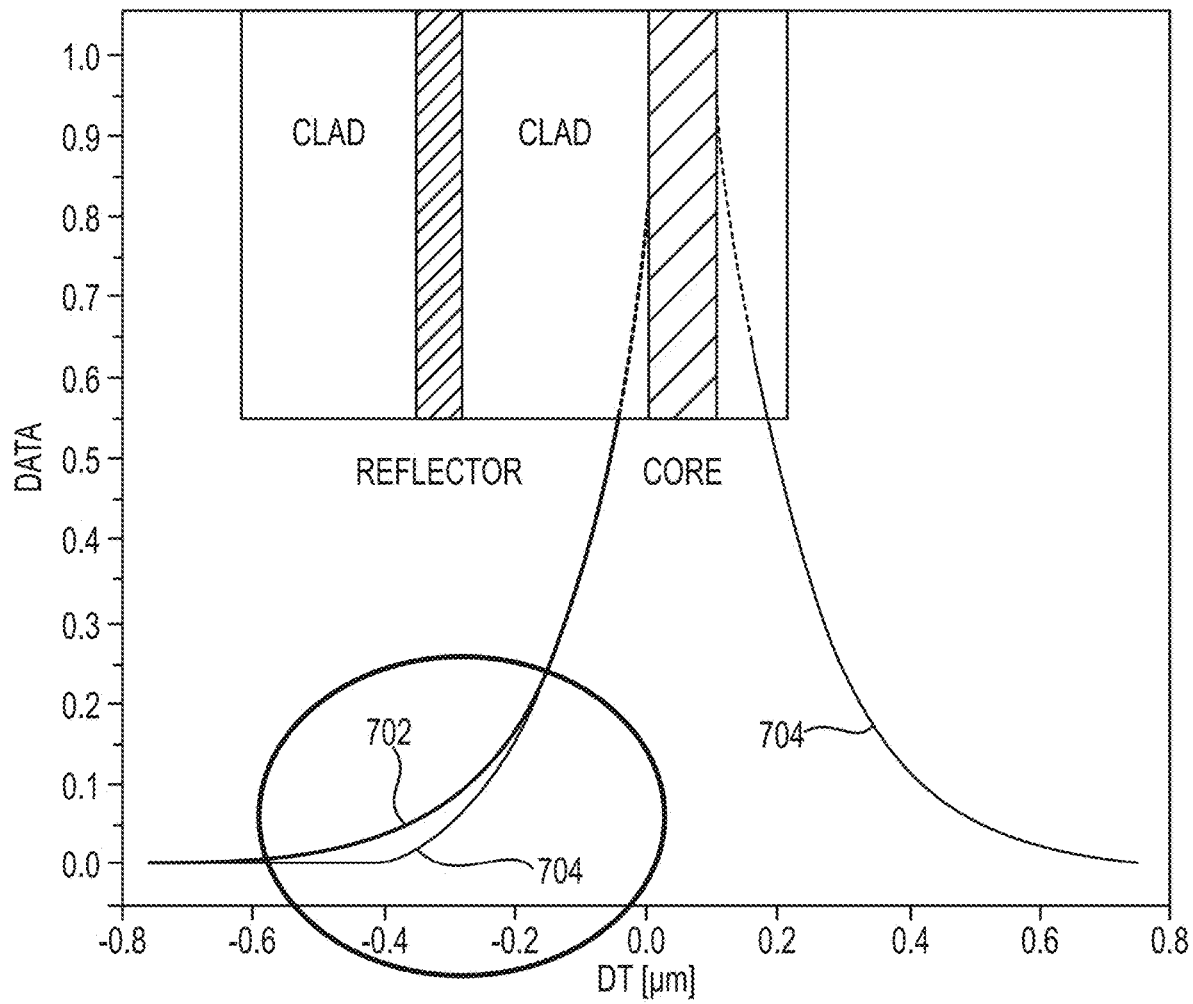
FIG. 7 is a mode analysis showing data as a function of the downtrack dimension.

Inclusion of a reflector also enhances field confinement in a guiding region. FIG. 7 illustrates a mode analysis for a channel waveguide 702 and for a reflector enhanced channel waveguide 704. In the circled portion, it is shown that the transverse E field's (Ex) tail of the leading edge is suppressed with the reflector enhanced channel waveguide 704. Thus, the reflector enhanced channel waveguide has less leaked light and can potentially reflect power back to the channel waveguide core if long tails of field show up. This reflection and decreased leakage result in enhanced field confinement in the guiding region.

Figure 8:
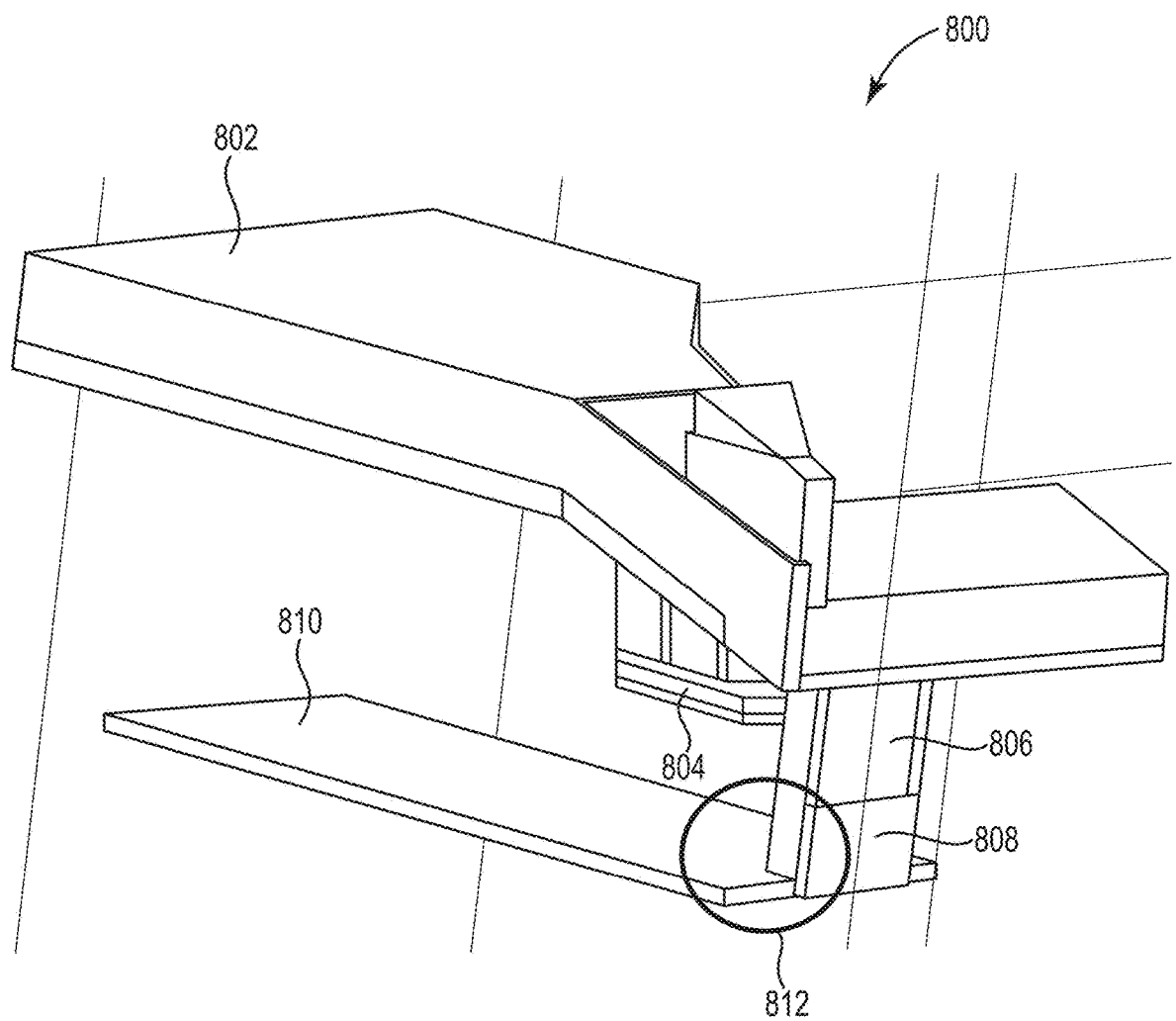
FIG. 8 is a perspective view of a recording head with a reflector according to embodiments described herein.

In FIG. 8, a perspective view shows a reflector enhanced recording head 800 according to example embodiments. The waveguide and cladding is removed to better show the relationships between the NFT 804, a side coupling structure 806, and the reflector 810. Also shown is the write pole 802 and a leading shield 808. Here, the side coupling structure is a small-sized SIM, or miniSIM, and circle 812 indicates where the miniSIM 806 connects with the reflector 810. Notably, a SIM, or miniSIM has two halves forming the mirror, but only half of the miniSIM is shown for illustration purposes here. Although also removed in FIG. 8, as shown above, the waveguide may be a channel waveguide that extends to an air-bearing surface having a core surrounded by cladding layers. The NFT 804 is positioned on a first side of the waveguide core, and the reflector 810 is a layer of metallic material disposed on a second side of the core facing away from the first side. The reflector extends beyond the core in a cross-track direction and extends in a direction normal to the air-bearing surface. In certain embodiments, the reflector has a thickness in a downtrack direction of less than 200 nm.

Figure 9:
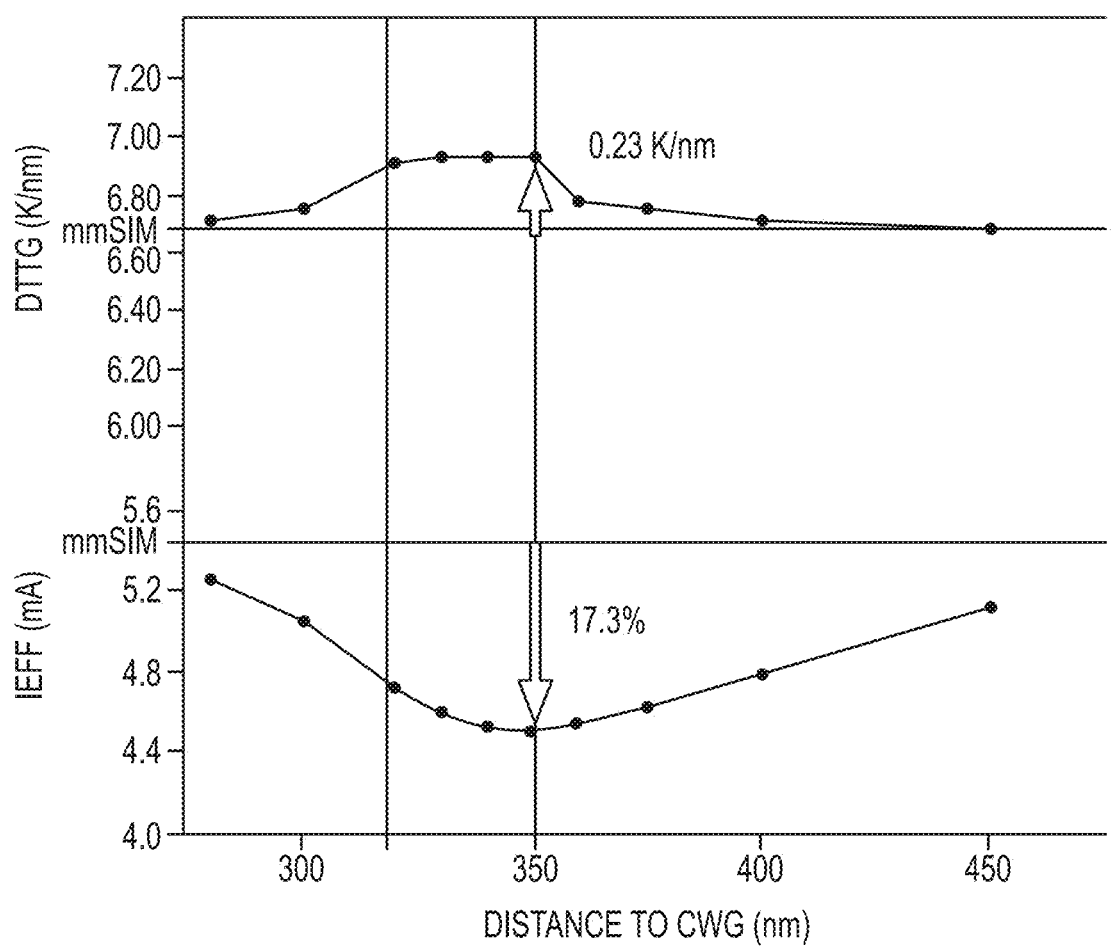
FIG. 9 is a plot of thermal gradient and effective current modeling with respect to the distance separating a reflector from the channel waveguide according to embodiments described herein.

Using the configuration of FIG. 8, FIG. 9 shows a plot of downtrack thermal gradient and effective current as functions of the distance the reflector is positioned from the waveguide. This mini SIM model (without a reflector) is used as a benchmark, which provides a thermal gradient (TG=6.7 K/nm) and effective current ($I_{eff}$=5.44 mA) when the leading shield 808 is included. As shown, when a reflector is added to the head the thermal gradient can gain a modest 0.23 K/nm increase, and the peg temperature dropped seven degrees. At the same time, the effective current can be reduced by >15%. There is a broad operation window that gives 10% $I_{eff}$ reduction with modest thermal gradient (TG) gain. The model for this data assumes a 40 nm thick metal film for the reflector in the downtrack direction (DT), 2.4 μm from the ABS, and 2 μm wide in the crosstrack (CT) direction.

Figure 10:
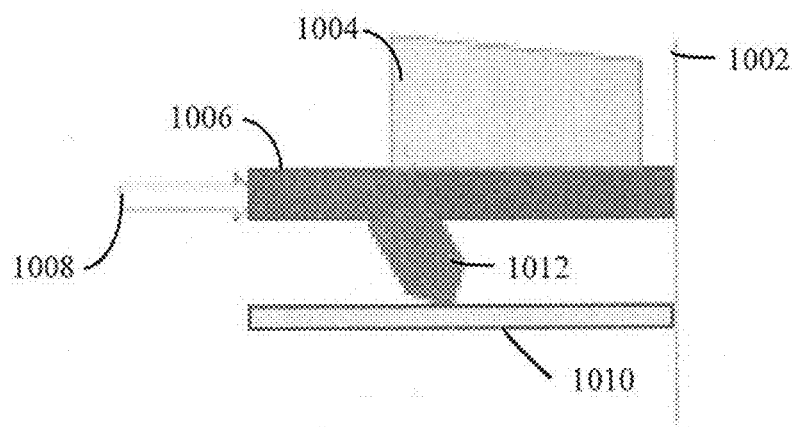
FIG. 10 is a side view of a recording head according to embodiments described herein.

In FIG. 10, a side, schematic view of a reflector enhanced waveguide is shown. Light enters the waveguide 1006 as shown by arrow 1008. The NFT 1004 is disposed on one side of the waveguide 1006 and the reflector 1010 is spaced apart from a second, opposing side of the waveguide 1006 in the downtrack direction. The ABS is depicted as line 1002. Scattered light exists from incomplete BDSC excitation as shown by arrow 1012. This is also shown by the arrows in FIGS. 11A and 12A. FIG. 11A shows field strength for a channel waveguide with a tall SIM, and FIG. 11B shows the reduced amount of light escaping when a reflector is added to the head. The reference to a "tall SIM" means that the SIM is long enough to be connected to the reflector when the reflector is added at a spacing (here of 350 nm). FIG. 12A shows field strength for a channel waveguide with a short SIM, and FIG. 12B shows the reduced amount of light escaping when a reflector is added to the head of FIG. 12A. The reference to a "short SIM" means that the SIM is not long enough to connect to the reflector when the reflector is added at a spacing. The top surface of the reflector in both figures was placed 350 nm away from bottom edge of the channel waveguide core. As shown, generally, the miniSIM recycles in-plane scattering, and the reflector can redirect out-of-plane scattering to the NFT. The reflector appears to be work more efficiently when connected to a miniSIM, as shown in FIG. 11B.

Referring again to FIG. 8 (which shows a cutaway of the NFT 804, miniSIM 806, reflector 810, and write pole 802), the circle 812 shows where the reflector 810 connects with the miniSIM 806. This view shows the "tall" or "deep" miniSIM, which extends in a downtrack distance away from the write pole 802 and the NFT 804. The tall miniSIM combined with a reflector enhanced channel waveguide can help reduce $I_{eff}$ by about 7%. However, connecting the deep miniSIM to the reflector can reduce $I_{eff}$ by about 15%. Experimental results for a channel waveguide with a mini-SIM, with a deep miniSIM, with a reflector and a miniSIM, and with a reflector connected with a deep miniSIM (as shown in FIG. 8) are summarized below in Table 2.

TABLE 2

| | Leading Shield ON | | | | | |
|---|---|---|---|---|---|---|
| | DT TG | CT TG | $I_{eff}$ | Head T | ATE | REFL |
| miniSIM | 6.69 | 7.31 | 5.44 | 284 | 56.69 | 0.60% |
| deep miniSIM | 6.71 | 7.33 | 5.17 | 277 | 56.60 | 0.43% |
| miniSIM + reflector (40) | 6.74 | 7.36 | 5.09 | 283 | 56.44 | 1.02% |
| deep miniSIM + reflector (40) | 6.93 | 7.41 | 4.51 | 277 | 56.04 | 0.60% |

Having the miniSIM extend down to the reflector helps to recycle power back into the NFT 804. Otherwise, the power will go to the leading shield 808 directly.

To evaluate the effect of the leading shield on head performance, the same data was collected for a configuration with the leading shield removed. This data is summarized below in Table 3.

TABLE 3

| | Leading Shield OFF | | | | | |
|---|---|---|---|---|---|---|
| | DT TG | CT TG | $I_{eff}$ | Head T | ATE | REFL |
| miniSIM | 6.61 | 7.20 | 5.25 | 280 | 57.28 | 0.79% |
| deep miniSIM | 6.68 | 7.29 | 5.06 | 283 | 56.79 | 0.44% |
| miniSIM + reflector (50) | 6.71 | 7.31 | 4.79 | 285 | 56.67 | 1.05% |
| deep miniSIM + reflector (50) | 6.90 | 7.38 | 4.45 | 281 | 56.20 | 0.07% |

Further analysis looked at the effect of recessing the miniSIM from the ABS. Recessing the miniSIM from the ABS has potential benefits including avoiding ABS protrusion and deformation. Here, the miniSIM 2 was recessed from the ABS by 40 nm, and the results are shown below in Table 4.

TABLE 4

| | Leading Shield OFF | | | | | |
|---|---|---|---|---|---|---|
| | DT TG | CT TG | $I_{eff}$ | Head T | ATE | REFL |
| miniSIM2 | 6.58 | 7.14 | 5.77 | 282.4 | 57.59 | 0.25% |
| miniSIM2 + reflector (50) (Detached) | 6.67 | 7.23 | 5.14 | 286 | 56.90 | 0.31% |
| miniSIM2 + reflector (50) (Attached) | 6.69 | 7.27 | 4.99 | 282 | 56.84 | 0.24% |

When recessing the miniSIM from the ABS by 40 nm, the reflector will still reduce the $I_{eff}$ by 14%, a similar efficiency improvement compared to the non-recessed case summarized in Tables 2 and 3.

Figure 13A:
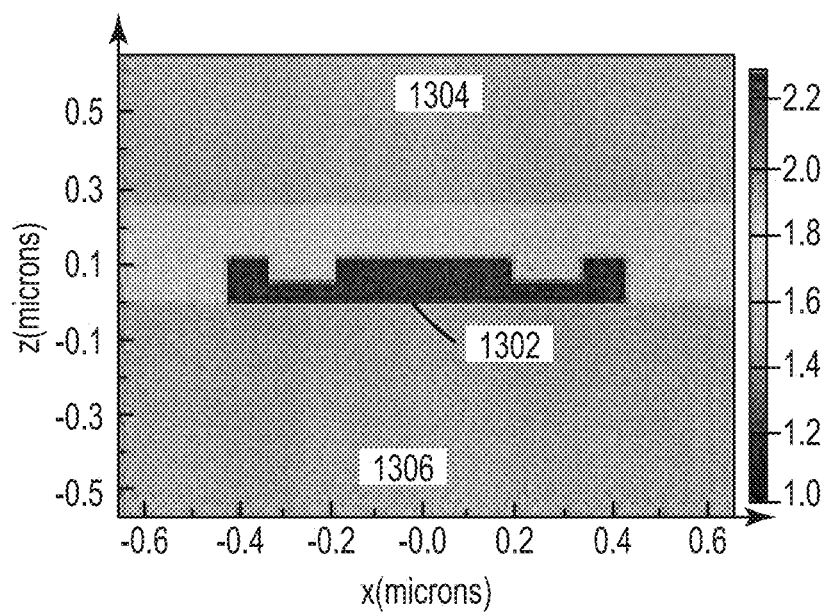
FIG. 13A is a cross-sectional view parallel to an air-bearing surface of a recording head having a dual slot waveguide.
Figure 13B:
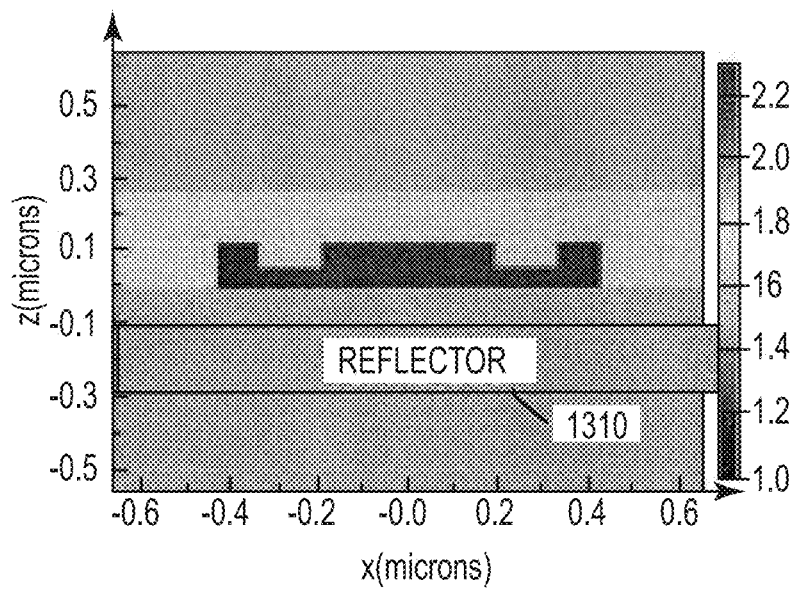
FIG. 13B is a cross-sectional view parallel to an air-bearing surface of a recording head having a dual slot waveguide according to embodiments described herein.

While the above data was collected for embodiments involving a channel waveguide, the reflector may be used with other light delivery systems. For example, the reflector may be used with a dual slot waveguide as shown in FIGS. 13A-B. The cross-sectional view in FIG. 13A illustrates the waveguide core 1302 surrounded by upper cladding 1304 and lower cladding 1306. In FIG. 13B, the dual slot waveguide of FIG. 13A is shown including a reflector 1310, as described above, and such a waveguide may be referred to as a reflector enhance dual slot waveguide.

Figure 14A:
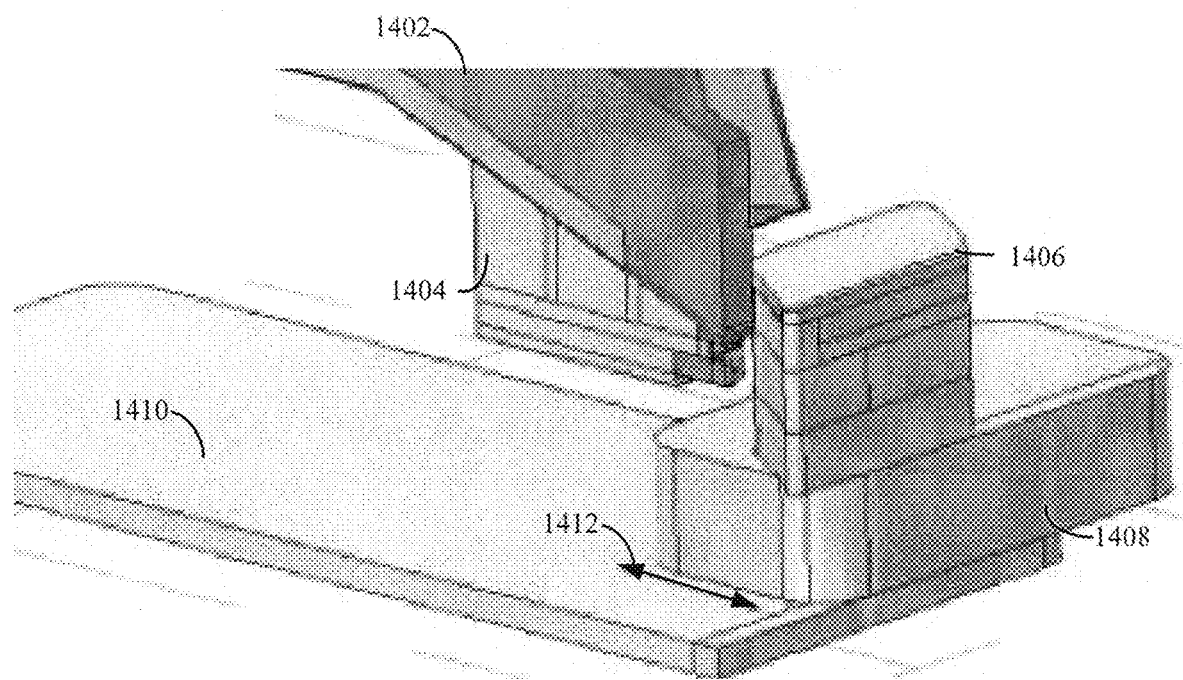
FIG. 14A is a perspective view of a recording head having a step between a miniSIM and a reflector according to embodiments described herein.
Figure 14B:
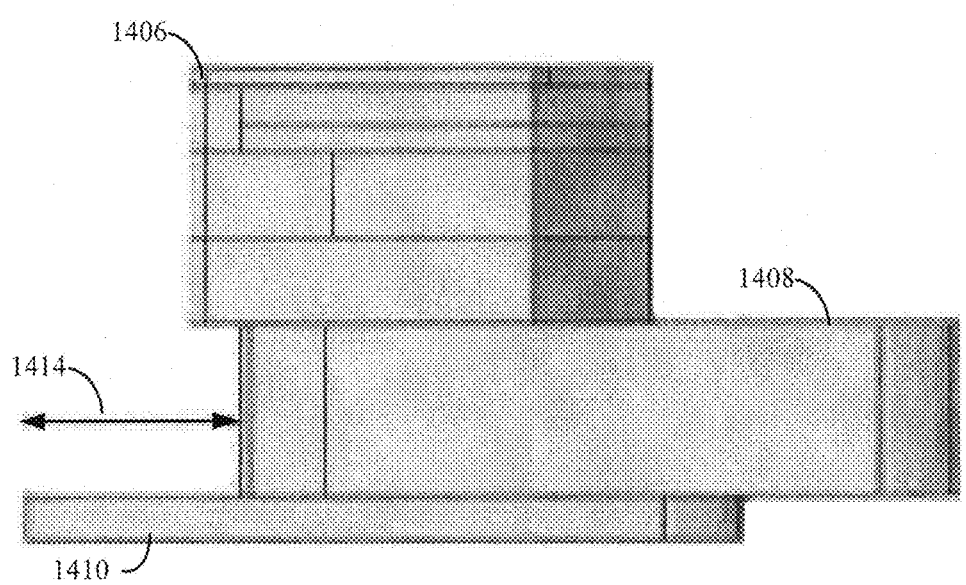
FIG. 14B is a cross-sectional view parallel to an air-bearing surface of the reflector, step, and miniSIM of FIG. 14A.

As discussed above, it is important to connect the side coupling structure (e.g. a miniSIM) to the reflector. However, the deep miniSIM of FIG. 8 may be difficult to manufacture due to the large mill depth. This difficulty may be addressed using an alternative, two-stepped design. FIGS. 14A-B illustrate a perspective view (FIG. 14A) and an ABS view (FIG. 14B) of a recording head having a reflector and a step between the miniSIM and the reflector. In FIG. 14A, a miniSIM 1406 extends from proximate the write pole 1402 and the NFT 1404 toward the reflector 1410. However, a step 1408 is provided between the miniSIM 1406 and reflector 1410. Notably, only half of the miniSIM and step are shown for illustration purposes. In certain embodiments, the miniSIM 1406 of FIGS. 14A-B has a 1 μm crosstrack dimension, 300-350 nm height into the recording head from the ABS, and a 400 nm depth. As discussed above, the bottom reflector 1410 is placed 350 nm away from the waveguide and has a thickness of 60 nm. The step 1408 has a 600 nm crosstrack gap, a 500 nm height into the recording head from the ABS, and a downtrack depth of about 200-250 nm.

Figure 15:
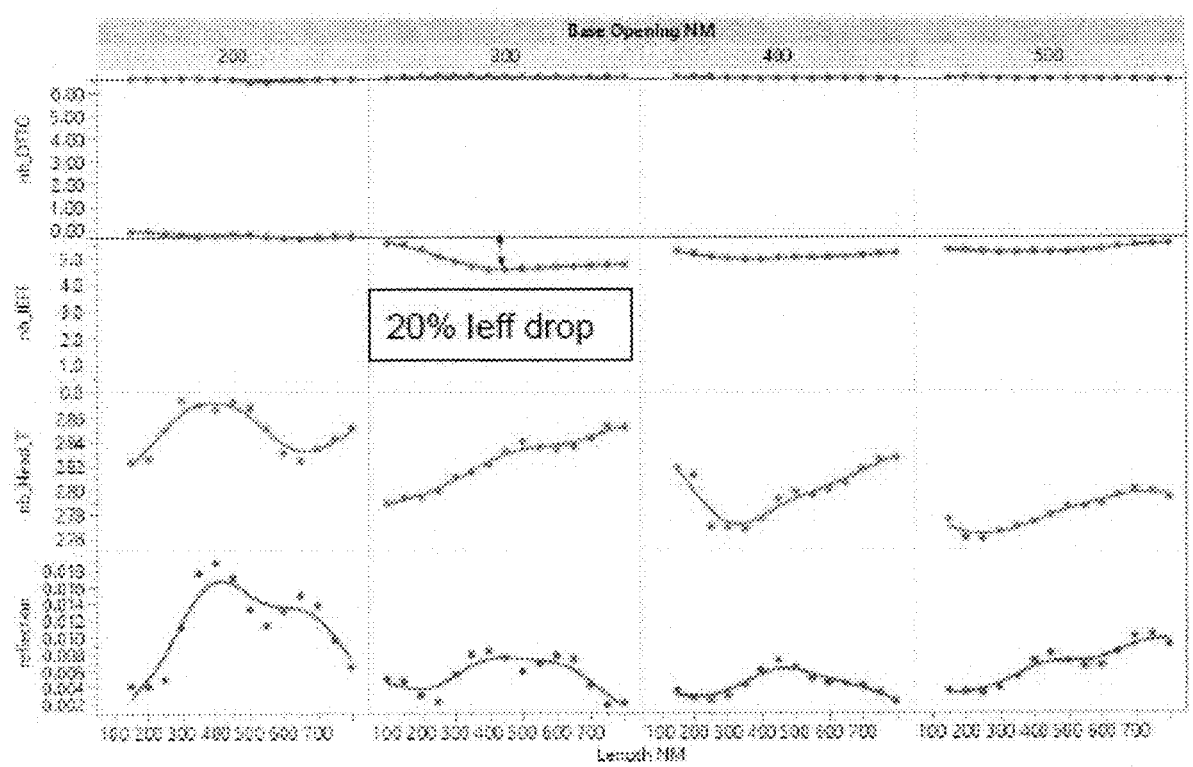
FIG. 15 is a plot of analysis results for the waveguide of FIG. 14A having various opening sizes according to embodiments described herein.
Figure 16:
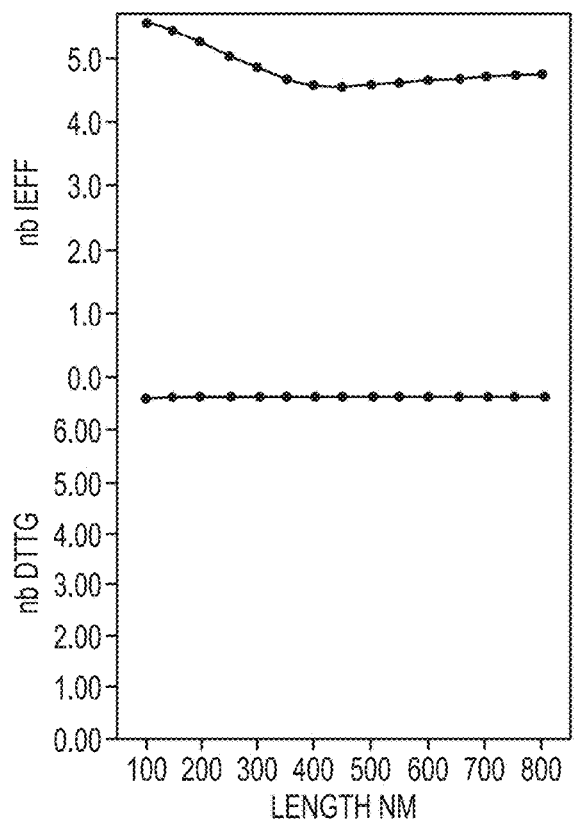
FIG. 16 is a plot of effective current and downtrack thermal gradient as functions of step length for the waveguide of FIG. 14A.
Figure 17:
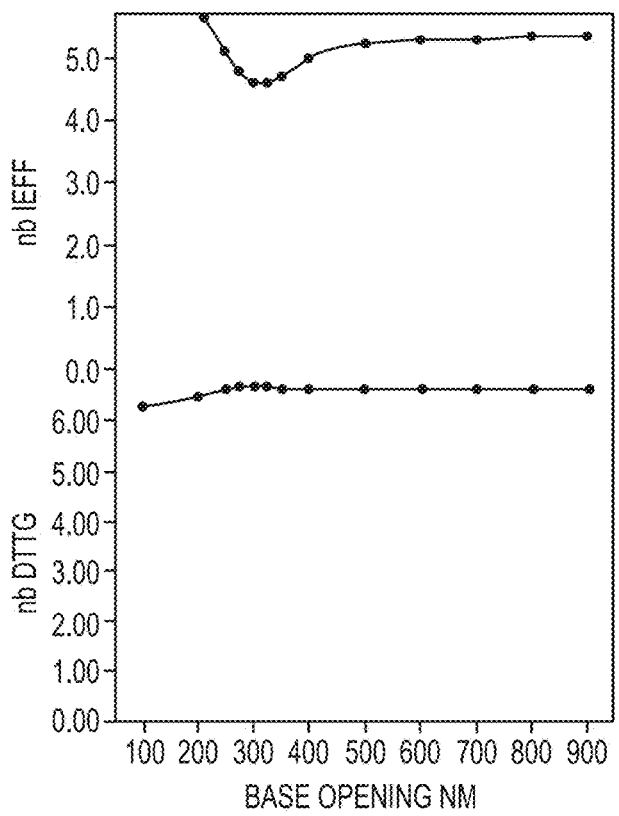
FIG. 17 is a plot of effective current and downtrack thermal gradient as functions of step gap size for the waveguide of FIG. 14A.

FIG. 15 summarizes modeling results for the above-described design of FIG. 14A. The downtrack thermal gradient (DT TG), effective current ($I_{eff}$), recording head temperature (T), and reflection were measured for various sizes of base openings (arrow 1414 in FIG. 14B represents half of the opening) and miniSIM lengths (arrow 1412 in FIG. 14A). As shown, the stepped connection between the side coupling structure and the reflector provides a 20% drop in $I_{eff}$. FIG. 16 highlights the effect of the length the miniSIM extends into the recording head from the ABS (arrow 1412) on both the $I_{eff}$ and the downtrack thermal gradient. FIG. 17 shows the effect of varying the size of the base opening in the step (arrow 1414 represents half of the opening) on both the $T_{eff}$ and the downtrack thermal gradient. FIG. 17 indicates that the crosstrack distance should be controlled to 600+/−100 nm.

Figure 18:
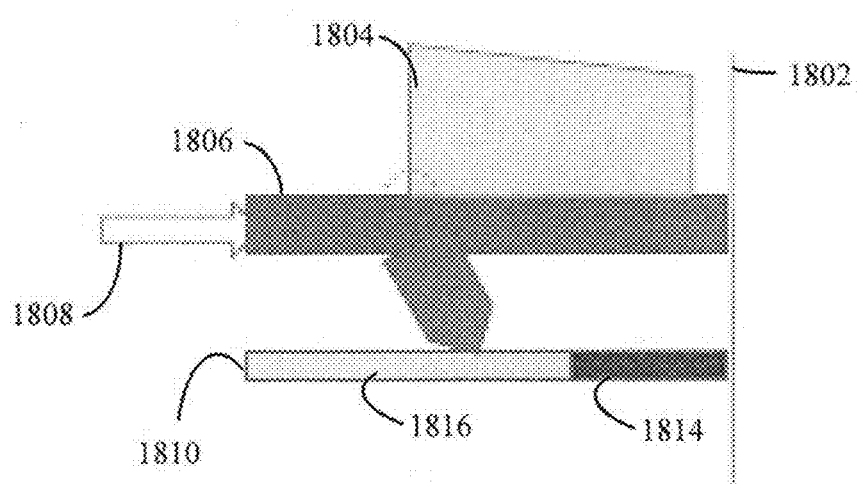
FIG. 18 is a side view of a recording head according to embodiments described herein.
Figure 19:
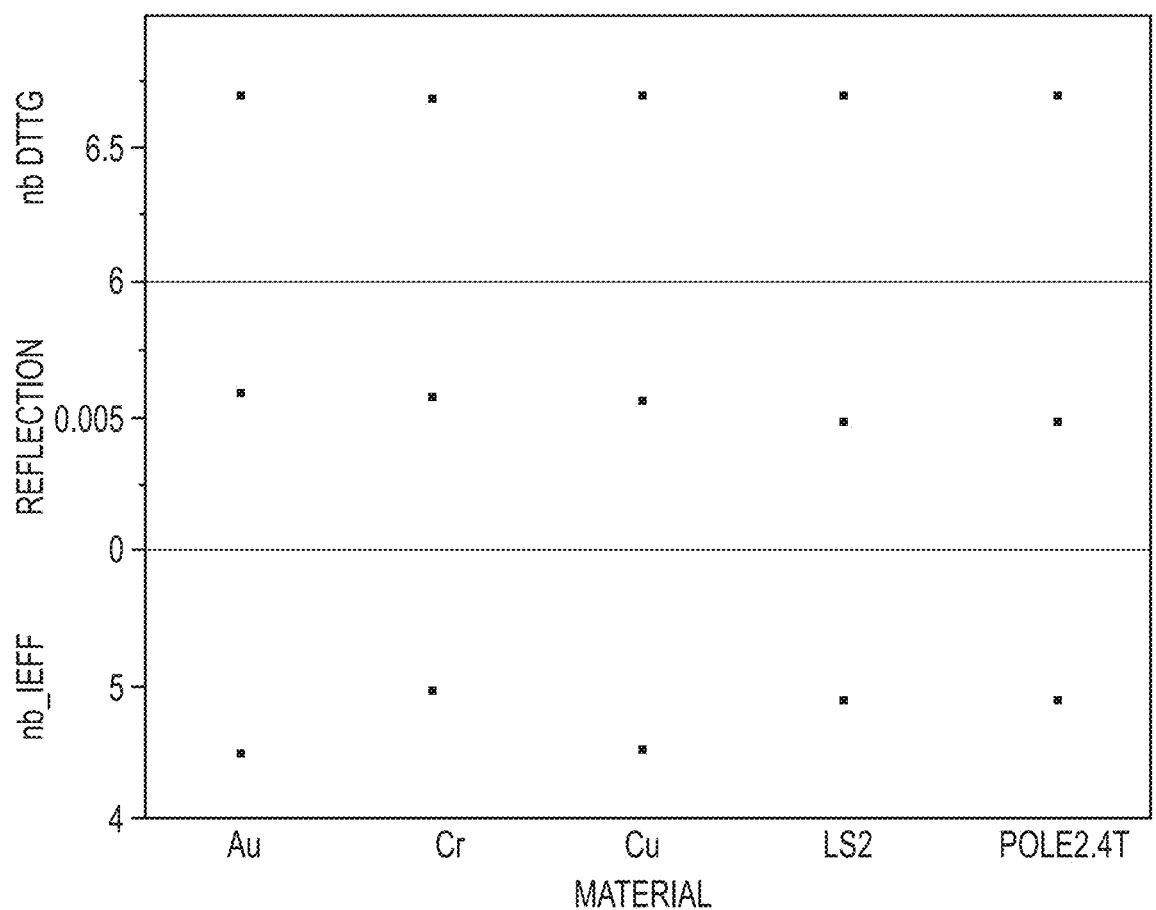
FIG. 19 is a plot of downtrack thermal gradient, reflection, and effective current as a function of reflector material.

A number of different materials may be used for the reflector embodiments discussed herein. For the reflector, gold and copper provide good optical properties; therefore, more light can be reflected in the NFT. There is little thermal gradient difference for different reflector materials. This is because the stray light is out-of-plane, far from the NFT. Poor optical metals (e.g., ferrous pole material) will also provide some benefit (10%-13% reduction in $I_{eff}$), while copper/gold gives greater than 20% $I_{eff}$ reduction. FIG. 19 shows the effect various materials have on the downtrack thermal gradient, reflection, and $I_{eff}$. Materials having good optical properties such as gold, chromium, and copper are compared with materials used in a leading shield or in the pole (e.g., compounds including iron or nickel). In certain embodiments, the reflector may comprise more than one material. As shown in FIG. 18, light enters a waveguide 1806 as shown by arrow 1808. The NFT 1804 is disposed on one side of the waveguide 1806 and the reflector 1810 is disposed on an opposing side. The reflector 1810 comprises a first material 1814 proximate the ABS 1802 and a second material 1816 positioned further into the recording head. For example, ABS friendly materials (e.g., mechanically robust materials resistant to wear and corrosion) can be positioned on the ABS and the remainder of the reflector may be formed of materials with better optical properties such as gold, copper, silver, etc.

In summary, a recording head may include a reflector (comprised of materials having one or more of good optical properties, such as Au/Cu/Ag, or materials compatible with the recording head process, such as Cr, W, or Fe/Ni-based) in the bottom cladding to enhance waveguide to NFT excitation. The reflector may connect with a side coupling structure (such as miniSIM), either by extending the side coupling structure, or forming a step structure connecting the side coupling structure and bottom reflector. The reflector can be placed at a controlled distance from the bottom of the waveguide and with a controlled thickness to achieve small propagation loss in itself. This increases the efficiency of NFT excitation and provides additional heatsink to the NFT. In certain embodiments, the reflector is much wider than the waveguide core (e.g., >1.5 times), and can terminate before or at the ABS. The reflector may be in the form of a thin film of constant thickness from 20 nm to 200 nm, or a shape (e.g., wedge) of changing thickness from 20 nm to 200 nm. The reflector may cover a distance between about 0.5-10 μm as measured from close to the ABS to a location into the head in a direction normal to the ABS.

The above-described reflector, when added to the bottom cladding of a waveguide, blocks stray light and recycles power to the NFT. This increases the coupling efficiency of the NFT and waveguide, which in turn, reduces the needed effective current to read and/or write data and increases the recording head's reliability and operating life.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A recording head, comprising:
   a channel waveguide extending to an air-bearing surface, the waveguide comprising a core surrounded by cladding layers;
   a near-field transducer on a first side of the core;
   a reflector comprising a layer of metallic material on a second side of the core facing away from the first side, the reflector extending beyond the core in a cross-track direction and extending in a direction normal to the air-bearing surface, the reflector having a thickness in a downtrack direction of less than 200 nm; and
   first and second mirror portions forming a mirror surrounding the near-field transducer in a cross-track direction with a gap therebetween, extending in the downtrack direction, and connecting with the reflector, the mirror extending in the direction normal to the air-bearing surface a first distance that is less than a second distance that the near-field transducer extends in the direction normal to the air-bearing surface.

2. The recording head of claim 1, wherein the first and second mirror portions connect with the reflector via a step that extends a third distance in the direction normal to the air-bearing surface that is greater than the first distance, the step comprising a downtrack thickness that is greater than the thickness of the reflector.

3. The recording head of claim 2, wherein the step comprises two steps, one on each side of the gap between the first and second mirror portions, the two steps separated by a second gap that is larger than the gap between the first and second mirror portions.

4. The recording head of claim 1, wherein the reflector comprises at least one of gold, copper, silver, chromium, tungsten, compounds including iron, and compounds including nickel.

5. The recording head of claim 1, wherein the reflector comprises a first portion formed of Au or Cu that is separated from the air bearing surface, and a second portion formed of a mechanically robust material that extends between the air-bearing surface and the first portion.

6. The recording head of claim 1, wherein the reflector has a cross-track width that is at least 1.5 times greater than a corresponding cross-track width of the core.

7. The recording head of claim 1, wherein the reflector is positioned no more than 350 nm from the second side of the core.

8. The recording head of claim 1, wherein the reflector has a constant thickness in the downtrack direction extending in a direction normal to the air-bearing surface.

9. A recording head, comprising:
   a waveguide extending to an air-bearing surface, the waveguide comprising a core surrounded by cladding layers;
   a near-field transducer on a first side of the core;
   a reflector comprising a layer of metallic material on a second side of the core facing away from and opposing the first side, the reflector extending beyond the core in a cross-track direction and extending in a direction normal to the air-bearing surface, wherein the reflector has a cross-track width that is at least 1.5 times greater than a corresponding cross-track width of the core; and
   a side coupling structure extending in the downtrack direction from proximate the near-field transducer and coupling to the reflector.

10. The recording head of claim 9, wherein the waveguide is a channel waveguide.

11. The recording head of claim 9, wherein the waveguide is a dual-slot waveguide.

12. A recording head, comprising:
   a waveguide extending to an air-bearing surface, the waveguide comprising a core surrounded by cladding layers;
   a near-field transducer on a first side of the core;
   a reflector comprising a layer of metallic material on a second side of the core facing away from and opposing the first side, the reflector extending beyond the core in a cross-track direction and extending in a direction normal to the air-bearing surface; and
   a solid immersion mirror extending in the downtrack direction from proximate the near-field transducer and coupling to the reflector and that extends in the direction normal to the air-bearing surface a first distance that is less than a second distance that the near-field transducer extends in the direction normal to the air-bearing surface.

13. The recording head of claim 12, wherein the solid immersion mirror couples to the reflector via a step that extends a third distance in the direction normal to the air-bearing surface that is greater than the first distance, the step comprising a downtrack thickness that is greater than the thickness of the reflector.

14. The recording head of claim 9, wherein the reflector comprises at least one of gold, copper, silver, chromium, tungsten, compounds including iron, and compounds including nickel.

15. The recording head of claim 9, wherein the reflector comprises a first portion formed of Au or Cu that is separated from the air bearing surface, and a second portion formed of a mechanically robust material that extends between the air-bearing surface and the first portion.

16. The recording head of claim 9, wherein the reflector is positioned no more than 350 nm from the second side of the core.

17. The recording head of claim 9, wherein the reflector has a constant thickness in the downtrack direction extending in a direction normal to the air-bearing surface.

* * * * *